United States Patent

[11] 3,614,425

| [72] | Inventor | Mitsuru Yoshimatsu |
| | | Hoya, Tokyo, Japan |
| [21] | Appl. No. | 844,035 |
| [22] | Filed | July 23, 1969 |
| [45] | Patented | Oct. 19, 1971 |
| [73] | Assignee | Rigaku Denki Company Limited |
| | | Tokyo, Japan |
| [32] | Priority | Sept. 24, 1968 |
| [33] | | Japan |
| [31] | | 43/68268 |

[54] X-RAY DIFFRACTION APPARATUS COMPRISING A CURVED SPECTROSCOPIC CRYSTAL WITH A ROTATABLE X-RAY SLIT AT THE FOCUS THEREOF
2 Claims, 4 Drawing Figs.

[52] U.S. Cl. ................................................ 250/51.5, 250/65, 250/52
[51] Int. Cl. .................................................. G01n 23/20
[50] Field of Search .................................. 250/52, 53, 51.5, 65

[56] References Cited
UNITED STATES PATENTS

| 3,070,693 | 12/1962 | Furnas | 250/51.5 |
| 3,075,079 | 1/1963 | Tabikh | 250/51.5 |
| 3,411,000 | 11/1968 | Schliephake | 250/51.5 |

Primary Examiner—James W. Lawrence
Assistant Examiner—C. E. Church
Attorney—Alfred W. Breiner ABSTRACT: The present invention provides a microphotographic apparatus wherein only X-rays of a single wavelength separated by a curved spectroscopic crystal are allowed to fall upon a specimen and at the same time the specimen is rotated, thereby to vary the angle of incidence of said X-rays continuously.

X-RAY DIFFRACTION APPARATUS COMPRISING A CURVED SPECTROSCOPIC CRYSTAL WITH A ROTATABLE X-RAY SLIT AT THE FOCUS THEREOF

The present invention relates to an X-ray diffraction microphotographic apparatus.

As object of the invention is to provide a microphotographic apparatus which provides high-contrast images and is capable of photographing such specimens as imperfect in crystal structure without requiring so high mechanical accuracy.

Another object of the invention is to provide a microphotographic apparatus wherein fluorescent and scattered X-rays emerging from the specimen are remarkably diminished to improve the image contrast and wherein the photographic plate lies near the specimen to enable sharp images to be photographed.

Reference is to be made to the accompanying drawing in which.

Figure 1:
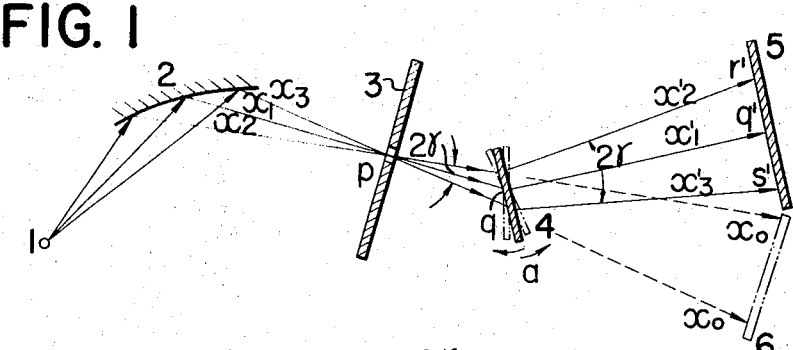
FIG. 1 is a schematic view of an embodiment of the present invention.

Now referring to FIG. 1 showing an X-ray diffraction microphotographic apparatus according to the present invention, an X-ray source 1 is a point focus type. X-rays emitted from the X-ray source 1 fall upon a curved spectroscopic crystal 2 and only the $K\alpha_1$ line characteristic to the target metal of an X-ray tube is diffracted. Hence, the diffracted X-rays focus at a point P on a line perpendicular to the plane of drawing. Arranged in this position is a slit 3. When two spectral lines $K\alpha_1$ and $K\alpha_2$ are reflected by the crystal 2, the $K\alpha_2$ line can be shut out by said slit 3. Any thin monocrystalline specimen 4 is arranged behind the slot 3, so that a single spectral line passing through the slit 3 falls upon the specimen 4. An X-ray photographic plate 5 is arranged in the position of incidence of the X-rays diffracted by the specimen 4. The specimen 4 is swung over a certain angle about an axis extending through the center c of the specimen 4 and perpendicular to the plane of drawing, as shown by arrows a.

Figure 2:
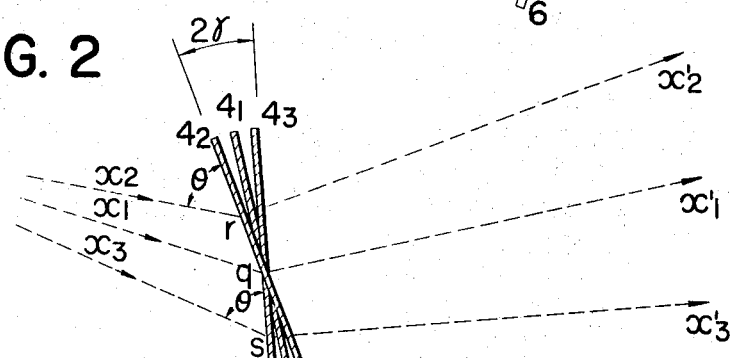
FIG. 2 is a partial enlarged view of the apparatus of FIG. 1.
Figure 4:
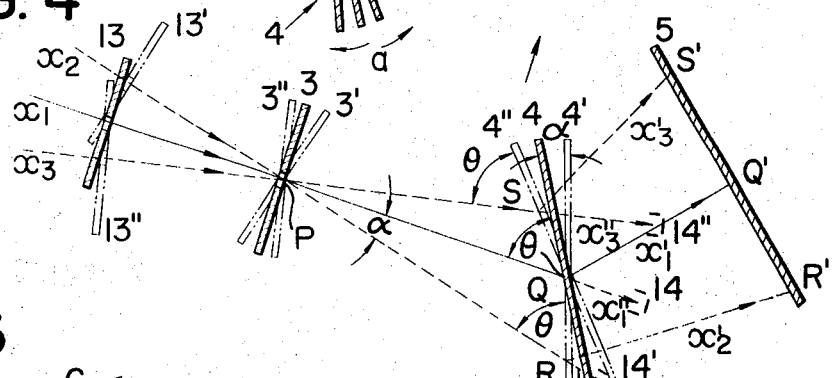
FIG. 4 is a view illustrating the operation of the apparatus of FIG. 3.

Thus, the $K\alpha_1$ line of the incident X-rays to the center of the spectroscopic crystal 2 from the X-ray source 1 is diffracted by said crystal, passes through the point P and falls upon substantially the center c of the specimen. This X-ray beam is designated as $x_1$. When the surface of the specimen 4 is positioned to $4_1$ in FIG. 2, said X-ray beam $x_1$ satisfies the Bragg's diffraction conditions, so that it is diffracted as $x_1'$ and falls upon the photographic plate at a point $q'$. However, the X-rays incident upon the other parts of the crystal 2 from the X-ray source 1, for example $x_2, x_3$, and so on are absorbed by the specimen or transmitted thereby to go straight on or scatter, for they do not fill the Bragg's diffraction conditions as to the angle of incidence upon the specimen 4. When the specimen rotates to the position of $4_2$ in FIG. 2, the X-ray beam $x_2$ diffracted at the side of the crystal 2 falls upon the specimen 4 at a point r with an angle of incidence satisfying the Bragg's diffraction conditions. It is, therefore, diffracted by the specimen as $x_2'$ and falls upon the plate 5 at a point $r'$, while the X-rays incident upon the other parts of the specimen do not satisfy the Bragg's conditions, so that they are absorbed by the specimen or pass straight therethrough or scatter, but do not enter the photographic plate 5. Then, when the surface of the specimen assumes the position of $4_3$ in FIG. 2, only the X-ray beam $x_3$ incident upon the specimen at a point S is diffracted as $x_3'$ and falls upon plate 5. at a point $S'$. In this way, the X-rays incident upon the parts of the specimen are diffracted one after another as the specimen rotates, and these diffracted X-rays fall upon the plate 5 at those points associated with the positions of incidence thereof upon the specimen, respectively. Thus, an image showing the crystal structure of the specimen is projected on the plate 5, which provides an X-ray diffraction microphotograph.

An enlarged image of the specimen can be naturally obtained by enlarging optically the photographed image on the plate 5. Further, as the angle of divergence, $2\alpha$, of the incident X-rays from the crystal 2 to the specimen 4 equals that of the incident X-rays to the plate 5, the magnification of an image to be photographed is increased and at the same time the field of the specimen to be photographed is reduced by bringing of specimen 4 closer to the point P, assuming that the distance from P to the plate 5 is constant. As the angle of incidence $\theta$ of the diffracted X-rays to the surface of the specimen 4 is also constant, rotation of the specimen over an angular range of not less than $2\alpha$, the angle of divergence of the incident X-rays, enables all the X-rays to be effectively utilized. In addition, if the radius of curvature of the curved spectroscopic crystal 2 is decreased, the angle of divergence of the X-rays will increase to enlarge the photographed field of the specimen and at the same time to enhance the intensity of X-rays thus leading to reduction of the exposure time. Further, an X-ray transmission photograph of the specimen can be obtained at the same time by arranging another photographic plate 6 in the position of incidence of an X-ray beam $x_0$ which passes straight through the specimen. Instead of swinging the specimen, it may be also swung by one travel at a low speed.

Figure 3:
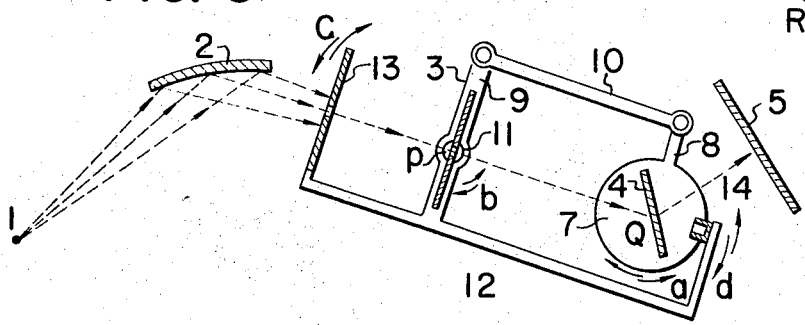
FIG. 3 is a front elevational view of another embodiment of the present invention.

In another embodiment of the present invention illustrated in FIG. 3, X-rays from a point X-ray source fall upon a curved spectroscopic crystal 2 and only the $K\alpha_1$ line characteristic to the target metal of an X-ray tube constituting said X-ray source is diffracted and the diffracted rays focus at a point P, in the same way as in FIG. 1. Arranged at this point P is a shaft 11 to which a slit 3 is attached. When two spectral lines $K\alpha_1$ and $K\alpha_2$ are reflected by the crystal 2, the $K\alpha_2$ can be thus shut out by the slit 3. A thin monocrystalline specimen 4 is arranged in such a way that X-rays passing through the slit 3 fall thereupon, said specimen being placed on a stage 7. The stage 7 is pivotally mounted about an axis extending through the center Q of the specimen and perpendicular to the plane of drawing. The ends of a link 10 are pivotally connected the end of an arm 8 extending from the stage and the end of an arm attached to said shaft 11. As the distance between the center Q of the specimen and the end of the arm 8 is made equal to that between the shaft 11 and the end of the arm 9, rotation of the stage 7 causes the shaft 11 to rotate synchronously at the same angular velocity. If the specimen is arranged in such a way that X-ray fall thereupon with a proper angle of incidence, the incident X-rays are diffracted. An X-ray photographic plate 5 is arranged behind the specimen 4 in such a position where the diffracted X-rays fall thereupon. Further, an E-shaped connecting member 12 is provided, its center leg being fixed to the shaft 11 at P. A slit 13 and a beam stopper 14 are attached to the side legs of said member 12 respectively. Said slit 13 is arranged between the focus P and the crystal 2 and said beam stopper 14 behind the specimen, the slits 13, 3 and said stopper 14 being positioned in a straight line.

When the stage 7 is swung over a proper circular arc as shown by arrows a, the shaft 11 rotates in the directions of a arrows b and therewith the slit 13 and the beam stopper 14 rotate also synchronously. Hence, when the slits 13, 3 and the specimen 4 take the positions of solid lines, an X-ray beam $x_1$ reflected at the center of the crystal 2 passes through the slits and falls upon the specimen at the center Q with an angle of incidence Q. Assuming that this X-ray beam satisfies the Bragg's conditions for diffraction with respect to the crystal lattice plane of the specimen, it is diffracted as $x_1'$ and falls upon the plate 5 at a point $Q'$. X-rays reflected at other points on the spectroscopic crystal 2, $x_2, x_3, ....$, are intercepted by the slit 13. Thus, only the X-ray beam $x_1$ diffractable by the specimen falls thereupon and a part of the beam, $x_1''$, going straight on therethrough is caught by the beam stopper 14. When the specimen rotates to the beam stopper assume the positions of broken lines $13', 3'$ and $14'$. Thus, an X-ray beam $x_2$ reflected at one side of the crystal 2 falls upon the specimen $4'$ at a point R. In this case, since the slit $13'$ and the beam stopper $14'$ have rotated about the focus P by the same angle $\alpha$ as the angle of rotation of the specimen $\alpha$, the X-ray beam falls upon the specimen at an angle $\theta$. The Bragg's conditions for diffraction are thus satisfied; the X-ray beam $x_2$ incident upon the point R is diffracted as $x_2'$ and falls upon the plate that a point R', and at the same time an X-ray beam $x_2''$ directly transmitted by the specimen is caught by the beam stopper 14'. X-rays reflected at other points on the crystal 2 are intercepted by the slit 13', so that the specimen is affected by an X-ray beam only at the point R. When the specimen rotates further to the position of a broken line 4'', an X-ray beam $x_3$ passes through the slits 13'' and 3'' to fall upon the specimen at a point S at an angle $\theta$, and is diffracted thereby as $x_3'$ to fall upon the plate 5 at a point S'. Other X-ray beams $x_1$, $x_2$, ... are intercepted by the slit 13'' and a X-ray beam $x_3''$ directly transmitted by the specimen enters the beam stopper 14''.

In this way, the X-ray beam $x_1$, $x_2$ and $x_3$ fall upon the specimen one after another at the points Q, R and S as the specimen rotates and are diffracted to the points Q', R' and S' on the photographic 5, so that an image showing the crystal structure of the parts of the specimen are projected on the plate 5 to give an X-ray diffraction microphotograph. The specimen receives always only diffractable X-rays and other useless X-rays are all shut out by the slit 13. Therefore, fluorescent or scattered X-rays originating in the specimen which enter the photographic plate are remarkably reduced, thus improving the contract of photographed images. Part of the incident X-ray beam to the specimen goes straight on without being diffracted, but it is absorbed by the beam stopper 14. Since the beam stopper is movable with varying points of incidence on the specimen as shown by Q, R and S, the X-rays diffracted at the above points can enter the plate without being interrupted by the stopper and straight ones are caught by the latter. Hence, it is not necessary to arrange the photographic plate 5 in a remote distance from the specimen to separate the diffracted X-rays from the straight ones. The plate 5 may be placed near the specimen and so very sharp images can be photographed.

Instead of oscillatory rotation of the specimen, it may be also rotated by one travel at a low speed. In addition, it may be rotated about any other point than the focus Q. The photographic plate may be rotated together with the specimen to ensure that the diffracted X-rays fall upon the plate always at right angles. Interlocking of the specimen, slit 13, beam stopper 14 and other parts may be also effected by any other mechanism than above, for example, by gears.

As apparent from the above description, the apparatus according to the present invention does not require any parallel motion mechanism as is the case with conventional ones, but only makes a rotary motion for photographing. It is, therefore, simple in construction and easy to manufacture and operate. Deterioration in image contrast by fluorescent or scattered X-rays from the specimen can be prevented, for only the diffractable X-rays fall upon the specimen and other useless ones are intercepted beforehand. Further, X-rays directly transmitted by the specimen are stopped by the beam stopper, thus permitting the photographic plate to be arranged sufficiently near the specimen to enhance the sharpness of images. When a surface reflection X-ray photograph is to be taken with the sensitive plate closely facing the surface of the specimen, no beam stopper is naturally needed.

I claim:

1. X-ray diffraction apparatus comprising an X-ray source; a curved spectroscopic crystal having a focus and positioned to receive X-rays from said source; an X-ray slit positioned at said focus; means for supporting a specimen and a photographic plate at a position to receive X-rays traversing said slit, the relative positions of said specimen and said plate being fixed; a photographic plate; means for rotating said slit about said focus at a given velocity; and means for rotating said means for supporting about a point other than said focus at said given velocity, the foregoing elements being constructed and arranged such that X-rays of a single wavelength separated by said curved crystal are allowed to fall upon said specimen, and said specimen is swingable within an angular range corresponding to the angle of divergence of incident X-rays and X-rays diffracted by said specimen are projected on said photographic plate.

2. An apparatus as set forth in claim 1 wherein a beam stopper is arranged behind said specimen and rotated about the focus of X-rays synchronously with said specimen at the same angular velocity.